United States Patent
Qi (10) Patent No.: US 9,347,356 B2
(45) Date of Patent: May 24, 2016

(54) EXHAUST GAS PROCESSING SYSTEM INDEPENDENT TO ENGINE CONTROLS

(71) Applicant: Baohua Qi, Marietta, GA (US)

(72) Inventor: Baohua Qi, Marietta, GA (US)

(*) Notice: Subject to any disclaimer, the term of this patent is extended or adjusted under 35 U.S.C. 154(b) by 0 days.

(21) Appl. No.: 14/702,885

(22) Filed: May 4, 2015

(65) Prior Publication Data

US 2015/0322838 A1    Nov. 12, 2015

Related U.S. Application Data (60) Provisional application No. 61/989,364, filed on May 6, 2014.

(51) Int. Cl.
| | | |
|---|---|---|
| F01N 3/00 | (2006.01) | |
| F01N 3/20 | (2006.01) | |
| F01N 9/00 | (2006.01) | |
| F01N 11/00 | (2006.01) | |
| F01N 13/00 | (2010.01) | |

(52) U.S. Cl.
CPC ....... *F01N 3/208* (2013.01); *F01N 9/00* (2013.01); *F01N 11/00* (2013.01); *F01N 13/0093* (2014.06); *F01N 13/011* (2014.06); *F01N 2470/30* (2013.01); *F01N 2550/05* (2013.01); *F01N 2560/06* (2013.01); *F01N 2560/08* (2013.01); *F01N 2610/02* (2013.01); *F01N 2610/1453* (2013.01); *F01N 2900/1404* (2013.01); *F01N 2900/1406* (2013.01); *F01N 2900/1812* (2013.01)

(58) Field of Classification Search
USPC ........... 60/274, 276, 277, 286, 295, 297, 301, 60/303
See application file for complete search history.

(56) References Cited

U.S. PATENT DOCUMENTS

| | | | | | |
|---|---|---|---|---|---|
| 4,665,690 | A * | 5/1987 | Nomoto | ............... | F01N 3/0253 422/107 |
| 7,500,355 | B2 * | 3/2009 | Masuda | ................ | F01N 3/103 60/277 |
| 7,797,927 | B2 * | 9/2010 | Nagaoka | ............ | B01D 53/9495 60/276 |
| 8,347,606 | B2 * | 1/2013 | Sakimoto | ............ | B01F 3/04049 60/285 |
| 8,820,052 | B2 * | 9/2014 | Levin | .................... | F01N 3/2066 60/274 |
| 8,959,900 | B2 * | 2/2015 | Solbrig | ................. | F01N 3/0253 60/286 |

* cited by examiner

*Primary Examiner* — Binh Q Tran (57) ABSTRACT

A multi-functional apparatus and method for diagnosing issues in an engine system with a SCR exhaust gas processing system and controlling reductant delivery to the SCR system. The apparatus includes a Venturi exhaust passage device with a reductant injector positioned on a transition from a low pressure passage to a downstream high pressure passage. Temperature and pressures in the Venturi exhaust passage device are measured, and an exhaust flow rate value is calculated. The exhaust flow rate value can be used in controlling reductant delivery, and with a downstream lambda sensing value, the exhaust flow rate value, and a temperature sensing value, a variety of issues in the engine system and the SCR system can be detected. No engine operating parameter is required in the SCR controls and diagnostic algorithms, and less reductant deposit is introduced due to the elimination of stagnant area in the exhaust passage device.

20 Claims, 10 Drawing Sheets

EXHAUST GAS PROCESSING SYSTEM INDEPENDENT TO ENGINE CONTROLS

This present application claims priority from U.S. provisional application No. 61/989,364 having the same title as the present invention and filed on May 6, 2014.

TECHNICAL FIELD OF THE INVENTION

This invention relates to an apparatus and method for diagnosing issues in an internal combustion engine system with an exhaust gas processing system for removing regulated species, and controlling the exhaust gas processing system, more specifically, to an apparatus and method for diagnosing issues in an internal combustion engine system with a SCR (Selective Catalytic Reduction) system and controlling reductant delivery to the SCR system.

BACKGROUND OF THE INVENTION

Environmentally harmful species in the exhaust gas emitted from an internal combustion engine, such as hydrocarbons (HC), carbon monoxide (CO), particulate matters (PM), and nitric oxides (NOx) are regulated species that need to be removed from the exhaust gas. In lean combustion engines, due to the effects of large amount oxygen excess, passive means without extra dosing agents, such as that using a three-way catalyst, normally are not able to effectively remove the oxidative specie NOx, as that in most of spark-ignition engines. To reduce NOx in lean combustion engines, a variety of active means with reducing agents (reductants) being dosed in exhaust gas are developed. In these technologies, typically the reductant is metered and injected into the exhaust gas, and the result mixture flows into a SCR catalyst, where the reductant selectively reacts with NOx generating non-poisonous species, such as nitrogen, carbon dioxide, and water.

A variety of reductants, such as ammonia (NH3), HC, and hydrogen (H2) can be used in SCR systems. Among them, ammonia SCR is used most broadly due to high conversion efficiency and wide temperature window. Ammonia can be dosed directly. However, due to safety concerns and difficulties in handling pure ammonia, normally urea solution, which is also called reductant, is used in ammonia SCR systems. Urea can be converted to ammonia in exhaust gas through thermolysis and hydrolysis.

Typically, in a SCR control system, the required ammonia dosing rate is calculated in an ECU (Engine Control Unit) or in a DCU (Dosing Control Unit) in response to a few parameters, such as engine operating parameters, exhausts gas temperature, exhaust gas flow rate, and engine out NOx level. In these parameters, the engine operating parameters, including engine fueling rate and engine speed, which are used in both estimating key factor values in SCR controls and diagnostics and enable conditions in SCR system diagnostics, are critical. For example, in some engine systems, especially engine systems without using EGR (Exhaust Gas Recirculation), both of the engine out NOx level and exhaust gas flow rate can be accurately estimated with the engine fueling rate and engine speed, while in engine systems with EGR, the engine fueling rate and engine speed are also key factors in the estimation. The exhaust flow rate and engine out NOx level are key parameters in both of SCR controls and diagnostics, while in a few SCR diagnostics, such as NOx sensor rationality diagnostics, the engine fueling rate is used as a key enable condition in comparing engine out NOx level and NOx sensor reading.

Normally the engine operating parameter values are obtained from engine controls. However, the engine operating parameter values are not always available, and in some engine systems, even they are available, their applications are limited due to the limits of the system structure. For example, in applications with mechanically controlled engines, e.g. in a vehicle retrofit, ECU and the engine operating parameter values are not available since engine fueling is controlled mechanically. In engine systems with multiple exhaust branches, e.g. in a high horse-power engine system, even the overall exhaust flow rate can be estimated with the engine fueling rate and engine speed, exhaust flow rate in each branch is not available. In these applications, to control the SCR system and diagnosing issues in the system, either more sensors, such as engine speed sensors and throttle position sensors, are installed in the engine system for obtaining the engine operating parameters, or more assumptions are used in estimation, e.g., assuming exhaust flow is equally distributed in each exhaust branch. Installing new sensors in an engine system changes system structure, causing reliability issues, while more assumptions deteriorate control performance and diagnosis capabilities. Moreover, when sensors are installed in the engine system, different engine types and applications require different sensor types, resulting in high system cost and engineering cost.

To reliably control a SCR system in an engine system without engine operating parameter values, a primary object of the present invention is to provide an apparatus to obtain key parameter values in a SCR control and diagnostic system without using engine operating parameters, so that the SCR control and diagnostic system is able to work without relying on them.

A further object of the present invention is to provide an apparatus to obtain key parameter values of a SCR control system only using sensors installed in the SCR control system, so that no further assumption is required for multiple branch systems.

Another object of the present invention is to provide a multi-functional sensing apparatus in a SCR control system, which not only provides key parameter values of the SCR control system, but also facilitates SCR controls.

Yet another object of the present invention is to provide a multi-functional sensing apparatus in a SCR control system, which not only provides key parameter values of the SCR control system, but also provides engine operating parameter values, which can be further used for diagnosing issues in an engine system.

BRIEF SUMMARY OF THE INVENTION

The present invention provides a multi-functional apparatus and method for diagnosing issues in an internal combustion engine system with a SCR system and controlling reductant delivery to the SCR system. More specifically, this apparatus includes a Venturi exhaust passage device which has an upstream high pressure passage, a low pressure passage, and a downstream high pressure passage. The upstream and downstream high pressure passages have their cross-section area larger than that of the low pressure passage. A temperature sensor is positioned on the upstream high pressure passage, while an absolute pressure sensor is used for measuring an exhaust gas pressure in the upstream high pressure passage. The difference between the exhaust gas pressure in the upstream high pressure passage and an exhaust gas pressure in the low pressure passage is measured with a differential pressure sensor, and a reductant injection device is positioned in a transition from the low pressure passage to the downstream high pressure passage. In an embodiment of the present invention, the Venturi exhaust passage device is positioned upstream from a SCR catalyst. An exhaust flow rate value is calculated with a pressure sensing value and a differential pressure sensing value obtained from the pressure and differential pressure sensors respectively, and a temperature sensing value obtained from the temperature sensor. And a reductant injection rate is calculated with the exhaust flow rate value, the temperature sensing value, and an engine out NOx level, which can be either a sensing value obtained from an upstream NOx sensor, or a value estimated with the temperature sensing value and the exhaust flow rate value. No engine operating parameter value is required in the SCR control, and less reductant deposit is introduced due to the elimination of stagnant area in the exhaust passage device.

In another embodiment of the present invention, a lambda sensor is installed downstream from the exhaust passage device. Sensing values obtained from the lambda sensor and the calculated exhaust flow rate values are used for estimating an engine fueling rate, which is further used together with the calculated exhaust flow rate value for detecting issues in the engine system and estimating engine out NOx level and engine speed. The calculated exhaust flow rate values, the estimated engine out NOx level values, and the estimated engine fueling rate values are used for detecting issues in the SCR system, while the estimated engine speed value is further used for diagnosing issues in an engine speed sensor.

In another embodiment of the present invention, a NOx sensor with lambda sensing capability is installed downstream from the exhaust passage device. The calculated engine out NOx level according to the lambda sensing values obtained from the NOx sensor and the calculated exhaust flow rate are further used for diagnosing rationality issues in the NOx sensor and issues in the SCR system. No engine operating parameter is used in the diagnostic algorithms.

DETAILED DESCRIPTION OF THE INVENTION

Figure 1A:
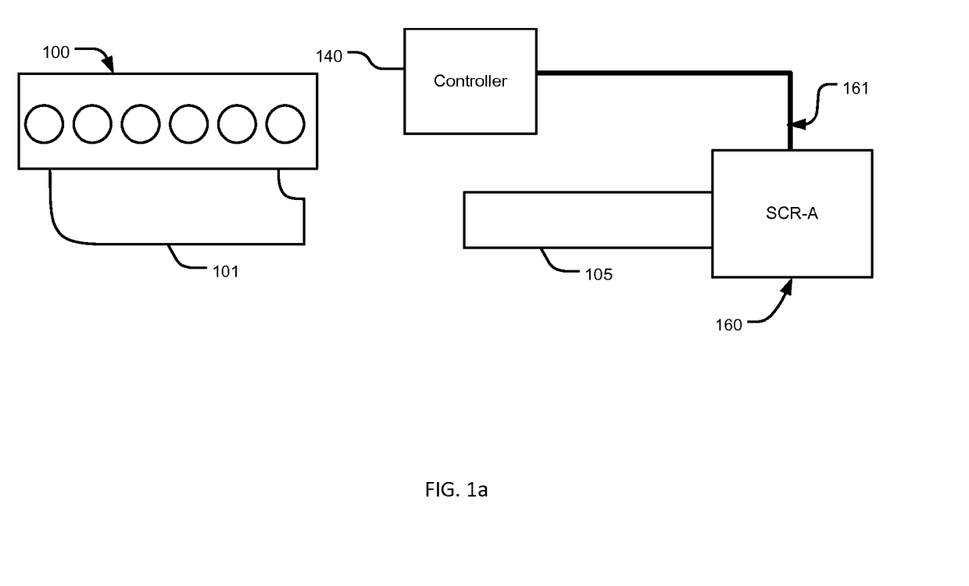
FIG. 1a is a schematic representation of an internal combustion engine with a single branch SCR system.

Referring to FIG. 1a, an engine 100 has a manifold 101. In a single branch system, exhaust gas produced by the engine 100 flows through the manifold 101 into an exhaust passage 105, entering a SCR device 160 controlled by a controller 140 through signal lines 161. In the SCR device 160, NOx in the exhaust gas is reduced. In a multi-branch system, referring to FIG. 1b, the exhaust gas generated by the engine 100 enters a splitting passage 102, at the inlet of which a NOx sensor 115 is installed in communication with the controller 140 through signal lines 147. A first exhaust passage 104 fluidly connects the splitting passage 102 to the SCR device 160, and a control valve 125, which is controlled by the controller 140 through signal lines 149, is used for controlling exhaust flow in the passage 104. In addition to the SCR device 160, a second SCR device 165 is fluidly connected to the splitting passage 102 through an exhaust passage 103. And a control valve 126 controlled by the controller 140 through signal lines 166 is positioned in the passage 103 for controlling exhaust flow therein.

Figure 1B:
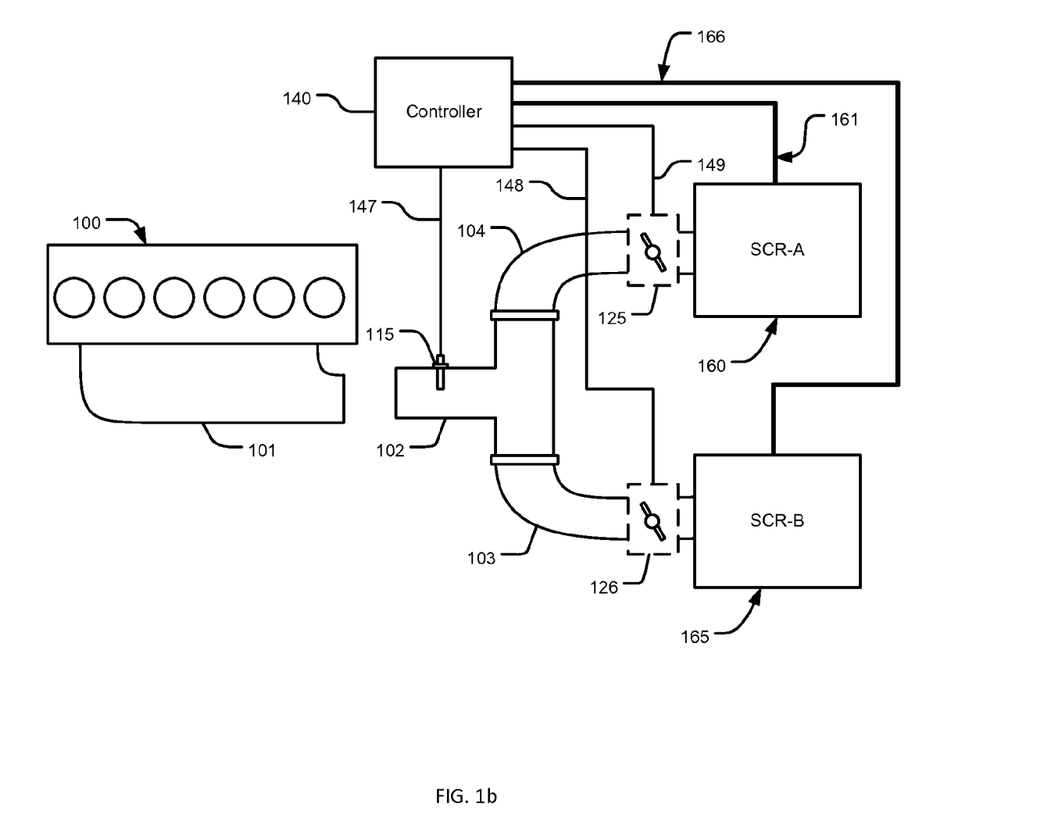
FIG. 1b is a schematic representation of an internal combustion engine with a multiple-branch SCR system.
Figure 1C:
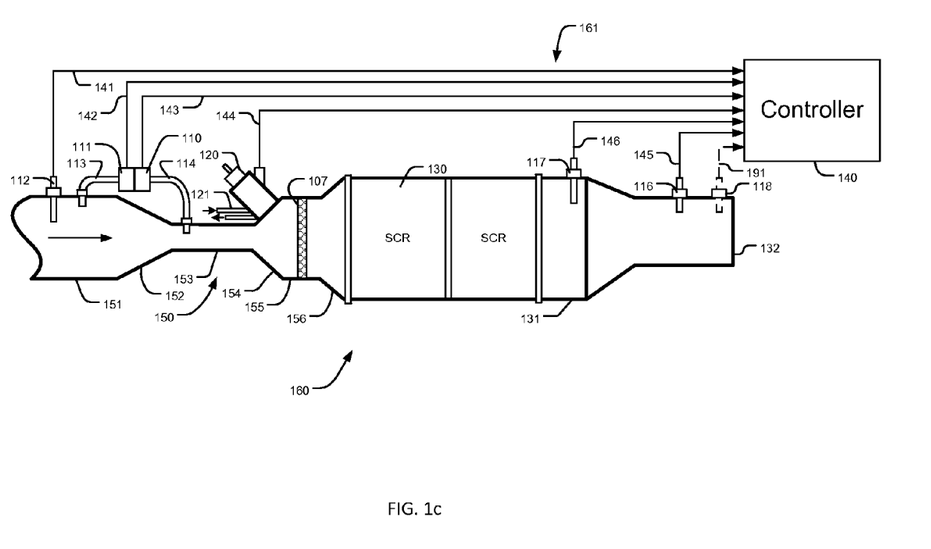
FIG. 1c depicts a SCR control system with a multi-functional decomposition pipe.

The SCR system 165 and 160 are of the same type, and an embodiment of the SCR system 160 is shown in FIG. 1c. In the system 160, a decomposition pipe 150 including an inlet exhaust passage 151, a first transition pipe 152, a low pressure exhaust passage 153, a second transition pipe 154, and an outlet exhaust passage 155 with a mixer 107 inside, is fluidly connected to a SCR catalyst section 130 through a transition pipe 156. On the inlet exhaust passage 151, a temperature sensor 112 is installed together with a pressure probe 113, which is connected to a pressure sensing module including a differential pressure sensor 111 and an absolute pressure sensor 110. The pressure sensing module has another sensing probe 114 positioned on the low pressure exhaust passage 153, and a reductant injector 120 is mounted on the second transition pipe 154 for providing reductant to exhaust gas. To keep the reductant injector 120 from being over-heated, coolant can be cycled in the injector 120 through a coolant passage 121. Downstream from the SCR catalyst section 130 is an extension portion 131 together with a tailpipe 132. A temperature sensor 117 is installed on the extension portion 131, while a NOx sensor 116 is positioned on the tailpipe 132 together with an optional wide band lambda sensor 118. In the SCR system 160, sensors and the injector 120 are in communication to the controller 140 through signal lines 161, which include signal lines 141 electrically connected to the temperature sensor 112, signals lines 142 and 143 electrically connected, respectively to the differential pressure sensor 111 and the pressure sensor 110, signal lines 144 electrically connected to the injector 120, signal lines 146 electrically connected to the temperature 146, signal lines 145 electrically connected to the NOx sensor 116, and signal lines 191 electrically connected to the optional lambda sensor 118.

In the SCR system 160, the decomposition pipe is used for creating a uniform exhaust flow mixed with reductant, which is then converted into ammonia through thermolysis and hydrolysis. Additionally, the inlet exhaust passage 151, the first transition pipe 152, and the low pressure exhaust pipe 153 form a Venturi structure, thereby, a volume matrix flow rate Q of the exhaust air passing through the SCR system 160 can be detected using a sensing value ΔP in Pascal obtained from the differential pressure sensor 111, a sensing value P obtained in Pascal from the pressure sensor 110, and a sensing value $T_{112}$ in Kelvin provided by the temperature sensor 112, according to the following equation:

$$Q = K_Q \sqrt{\frac{\Delta P T_{112}}{P}}, \quad (1)$$

where $K_Q$ is a constant and can be calculated using the following equation $$K_Q = \frac{\sqrt{2R}\, CA_1 A_2}{\sqrt{A_1^2 - A_2^2}}, \quad (2)$$

where R is the gas constant; C is the discharge coefficient; $A_1$ is the cross section area of the inlet exhaust passage 151, and $A_2$ is the cross section area of the low pressure exhaust passage 153. And the mass flow rate $m_f$ of the exhaust flow can be calculated using the following equation:

$$m_f = K_m \sqrt{\frac{\Delta PP}{T_{112}}}, \quad (3)$$

where $K_m$ is a constant and can be calculated using the equation:

$$K_m = \frac{\sqrt{2}\, CA_1 A_2}{\sqrt{R(A_1^2 - A_2^2)}}. \quad (4)$$

Furthermore, different from other systems in which a reductant injector is mounted on a cone structure in an exhaust passage, in the decomposition pipe 160, the injector 120 is positioned on the second transition pipe 154. The air flow through the transition pipe eliminates stagnant areas normally found in the cone structure. Thereby less reductant deposit is introduced.

Figure 1D:
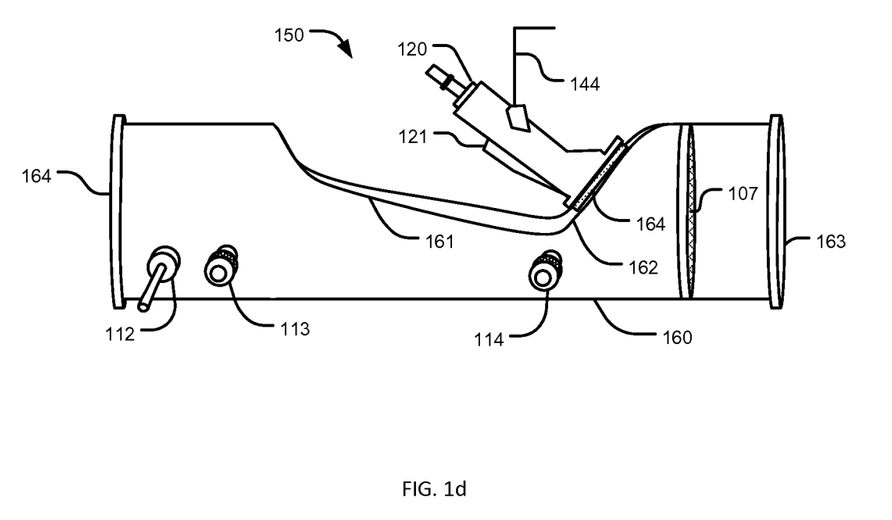
FIG. 1d shows an embodiment of a multi-functional decomposition pipe.

In the decomposition pipe 150, the transition pipes 152 and 154 need not to be cone transition pipes. As shown in FIG. 1d, in an embodiment of the decomposition pipe 150, transition pipes 161 and 162 have flat surfaces, and the injector 120 is mounted on the flat surface of the transition pipe 162 with a thermal isolation pad 164 under it. The thermal isolation pad can be a ceramic fiber pad keeps the injector 120 from touching the hot flat surface of the transition pipe 162 and seals the nozzle (now shown in FIG. 1d) of the injector 120 from leaking reductant to ambient. In the decomposition pipe 150 of FIG. 1d, a flange 164 is used for connecting the decomposition pipe to an upstream exhaust passage and a downstream exhaust passage is connected to a flange 163 of the decomposition pipe.

Figure 2:
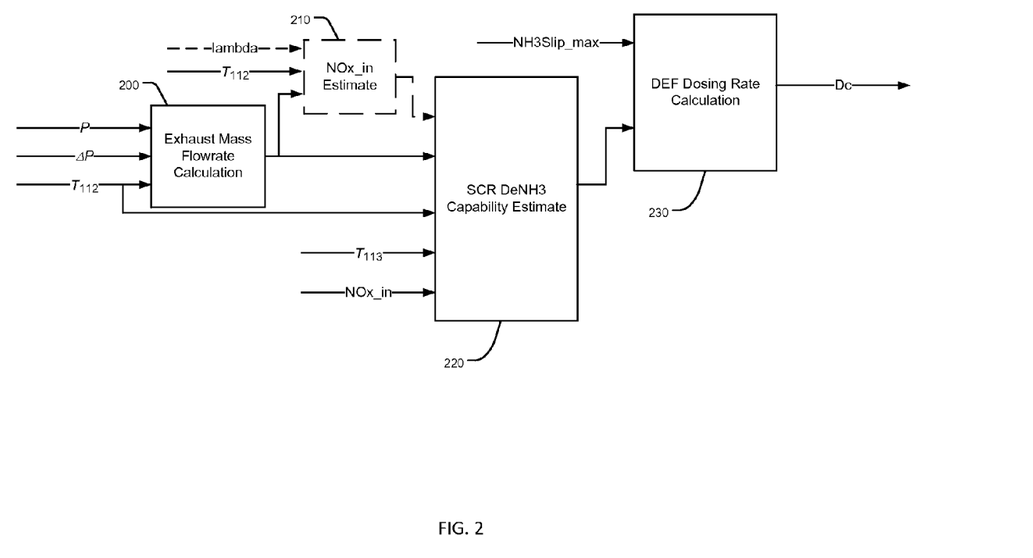
FIG. 2 is a block diagram of a SCR control scheme.

With the Venturi structure and the sensors 112, 111, and 110, exhaust mass flow rate can be obtained without knowing values of engine operating parameters. And with the calculated mass flow rate, SCR controls can be independent to engine controls. An example of such a SCR control is shown in FIG. 2. In this SCR control, exhaust mass flow-rate $m_f$ is calculated in a block 200 with the pressure value $\Delta P$ obtained from the differential pressure sensor 111, the pressure value P obtained from the pressure sensor 110, and the temperature value $T_{112}$ provided by the temperature sensor 112, according to equations (3) and (4). After the exhaust mass flow-rate is obtained, then in a block 220, it is used with the temperature sensing value $T_{112}$, a temperature sensing value $T_{113}$ obtained from the temperature sensor 113, and a NOx sensing value NOx_in obtained from an upstream NOx sensor, e.g., the NOx sensor 115 in FIG. 1b, in calculating a maximum ammonia reaction capability value, which indicates an de-ammonia efficiency, i.e., how much ammonia can be removed in the catalyst. With the calculated maximum ammonia reaction capability and a predetermined value NH3Slip_max, which is indicative of the maximum allowed ammonia slip or breakthrough, a reductant dosing command Dc can then be calculated in a block 230.

In the block 200, in addition to calculating the exhaust mass flow using equations (3) and (4), a simpler method is using a lookup table. In this method, exhaust air density is firstly calculated with the following formula:

$$\text{Exhaust\_Air\_Density} = P/(R^* T_{112}) \quad (F1)$$

Then the mess flow-rate $m_f$ is then calculated using a lookup table with two inputs of the exhaust air density value Exhaust_Air_Density and the differential pressure sensing value $\Delta P$. The lookup table can be populated either with experimental results or values calculated according to equations (3) and (4).

In the SCR control of FIG. 2, in addition to using the NOx sensing value NOx_in obtained from a NOx sensor, for engines without EGR (Exhaust Gas Recirculation) device, a NOx estimate value calculated in a block 210 according to the temperature sensing value $T_{112}$, the exhaust mass flow $m_f$, and an optional lambda sensing value, which can be obtained from a wide band lambda sensor (e.g. the optional wide band lambda sensor 118 in FIG. 1c) or a NOx sensor with a lambda output (e.g. the NOx sensor 116 of FIG. 1c), can also be used in calculating the SCR deNH3 capability. In engines without EGRs, exhaust gas temperature correlates to a peak combustion temperature which determines engine out NOx level. As a result, engine out NOx concentration can be estimated with exhaust gas temperature. However, exhaust gas temperature also changes when exhaust gas exchange heat with engine, engine coolant, and ambient, and the heat exchanging rate is affected by exhaust flow rate and exhaust temperature. When an engine is warm, the heat exchanging rate between exhaust gas and engine coolant is almost constant. The main factor affecting exhaust gas temperature is the heat exchange between exhaust air and engine parts, such as exhaust manifold, exhaust pipes and connectors. If the engine is cold, then the heat exchange between exhaust gas and engine coolant plays a significant role in affecting exhaust gas temperature. In this situation, exhaust flow is a better parameter for estimating NOx concentration. A variety of methods can be used for estimating engine out NOx concentration using the $m_f$ value and the $T_{112}$ value. And an exemplary method is calculating the NOx concentration value NOx_in_estimate with the following formula:

If $T_{112} > T\_thd$, then NOx_in_estimate=$f(T_{112}+dT_{112}/dt^*g(m_f, T_{112}), m_f)$; else, NOx_in_estimate=$h(m_f)$. (F2)

In the formula F2, f( ), g( ), and h( ) are functions that can be realized with lookup tables, the values of which can be obtained from experimental results; T_thd is a threshold for determining if an engine is warm, and $dT_{112}/dt$ is the changing rate of the temperature value $T_{112}$.

In the SCR control of FIG. 2, the dosing command Dc is calculated according to its SCR deNH3 capability rather than a SCR deNOx efficiency. Accordingly, the dosing command Dc is the maximum allowed dosing rate limited by the maximum allowed ammonia slip rather than the minimum dosing rate for achieving a required emission level or a target emission level. With this control, the highest deNOx efficiency that the SCR system is able to achieve can be obtained and thereby the system is more tolerable to uncertainties in sensing values, especially NOx sensing values obtained from NOx sensors or estimated with $T_{112}$ and $m_f$ values, and uncertainties caused by engine part-to-part variations. In calculating the SCR deNH3 capability, a variety of methods can be used, and in a simple method, the following formula can be used:

$$deNH3\_capability = p(NOx\_conc * m_f q(T_{112}/2 + T_{113}/2, m_f)) \quad (F3)$$

where NOx_conc is a NOx concentration value in ppm, which is either the value NOx_in obtained from the NOx sensor 115, or the NOx_in_estimate value calculated in the block 210, and p( ) is a function that can be realized with a lookup table.

With the deNH3_capability value, an intermediate dosing rate command Dci can be calculated with the following formula:

$$Dci = C * m_f * NH3Slip\_max/(1 - deNH3\_capability) \quad (F4)$$

where C is a constant, and its value is 2.94*1e6 when NH3slip_max is in ppm. After the calculation of the Dci value, the dosing command can then be obtained with limits that applied under different conditions. These limits include sensor validity limits, which set Dc to 0 when an invalid sensor status is detected, and dosing rate limits, which limit dosing changing rate for compensating sensor uncertainties in transient.

In calculating the mass flow-rate $m_f$, since compared to the $\Delta P$ value, the air density calculated with the pressure value P and the temperature sensing value $T_{112}$ changes much slower, the response time of the calculated mass flow-rate is mainly determined by that of the differential pressure sensor 111, and effects of mismatch in response time of different sensors are insignificant. As a result, a better transient control performance can be obtained with the calculated $m_f$ value when a fast-response differential pressure sensor 111 is used, and the accuracy in estimating engine out NOx level can be improved.

Figure 3:
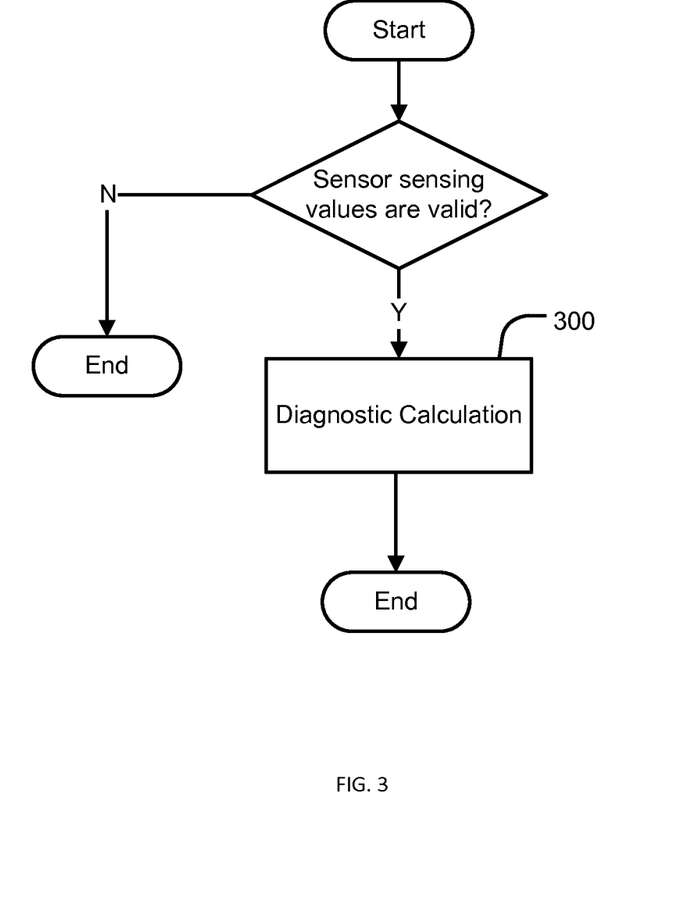
FIG. 3 is a flow chart of a service routine running periodically for a timer based interrupt for diagnosing issues in an engine system with a SCR system.

In addition to SCR controls, the $m_f$ value can also be used for diagnosing failures in engine systems and SCR systems. The diagnosis can be achieved by a service routine running periodically for a timer based interrupt in an engine control unit in communication to the controller 140, as shown in FIG. 3. In the service routine of FIG. 3, to avoid invalid or inappropriate sensing values from affecting diagnostic results, a diagnostic calculation block 300 only runs when sensor sensing values are valid. The validation conditions of the sensing values in FIG. 3 exclude invalid sensing values caused by sensor errors and sensor sensing capabilities. For example, for a system of FIG. 1c, when the $m_f$ value is used in a diagnostic calculation, in addition to errors in the temperature sensor 112, the pressure sensor 113, and the differential pressure sensor 110, to avoid effects of sensor response time to transient accuracy, a low changing rate of the $m_f$ value can also be included in the validity conditions of the sensing values.

In an engine without an EGR device, its fresh air flow rate equals to charge flow, which can be calculated with engine speed, intake manifold air temperature, and intake manifold air pressure. With the relation between the fresh air mass flow-rate, $m_{fresh}$, and the exhaust mass flow-rate, $m_f$, i.e., $$m_f = m_{fresh} + m_{fuel} \quad (5)$$

where $m_{fuel}$ is engine fueling rate, a mismatch between the $m_f$ value obtained with the Venturi structure 150, and the $m_f$ value calculated according to equation (5) with the calculated fresh air flow values and command values of the engine fueling rate is an indication of failures in either engine fuel injection, or engine fresh air flow path. Such failures may be caused by issues in engine fueling system, intake air leakage, problems in intake manifold sensors, and engine speed sensor failures. If a MAF (Mass Air Flow) sensor is used for measuring fresh air flow, then the fresh air flow rate $m_{fresh}$, calculated according to equation (5) with the $m_f$ value obtained with the Venturi structure 150 and command values of the engine fueling rate, can be compared to the value obtained from the MAF sensor. A mismatch between these two values indicates a sensing error of the MAF sensor if the engine fueling rate $m_{fuel}$ is correct.

For engines with or without EGRs, if lambda sensing values are available, then $$m_{fuel} = m_f/(1 + lambda * F0) \quad (6)$$

$$m_{fresh} = m_f * lambda * F0/(1 + lambda * F0) \quad (7)$$

where F0 is a stoichiometric air-fuel ratio. Equation (6) can be used for diagnosing issues in fuel injection, while problems in a MAF sensor (if installed) or engine controls can be detected according to equation (7). Furthermore, in a SCR system of FIG. 1a or FIG. 1b, equation (6) can also be used for detecting reductant quality issues caused by mistakenly filled hydrocarbon fuel in a reductant tank, which may coat SCR catalyst, blocking SCR reactions, and cause safety hazards when entering the SCR system.

Figure 4A:
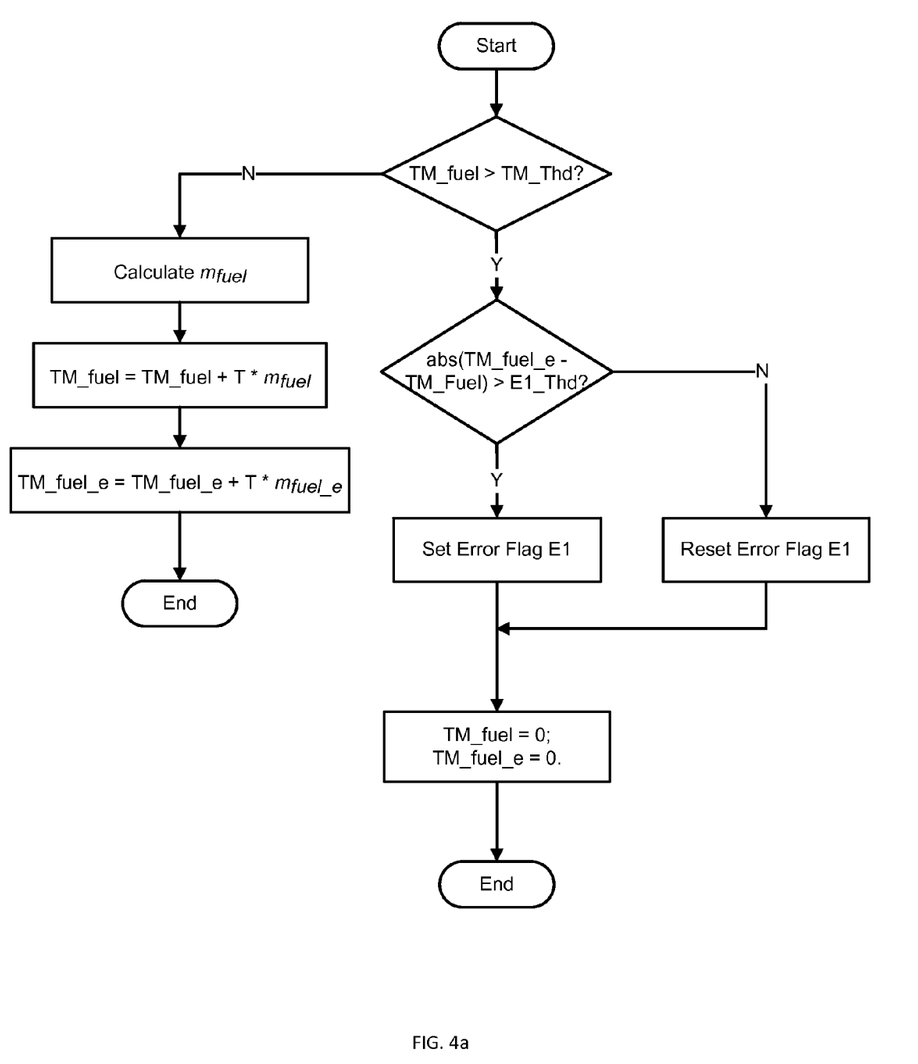
FIG. 4a is a flow chart of a diagnostic routine for detecting issues in an engine system with a SCR system using an estimated engine fueling rate.

According to equation (6), an equivalent fueling rate value $m_{fuel}$ can be calculated and the calculated $m_{fuel}$ value is then compared with an engine fueling rate $m_{fuel\_e}$ provided by engine control. A difference between the $m_{fuel\_e}$ value and the $m_{fuel}$ value indicates extra hydrocarbons exist in exhaust gas. This detection method can be realized with a routine incorporated in the block 300 of the interrupt service routine of FIG. 3, as shown in FIG. 4a. In this routine, a fueling amount value TM_fuel is firstly compared to a threshold TM_Thd. If it is not higher than the threshold value TM_Thd, then the $m_{fuel}$ value is calculated according to equation (6), and the TM_fuel value is accumulated with a product of the $m_{fuel}$ value times an execution period of the routine, T. Another fueling amount value TM_fuel_e is accumulated with the $m_{fuel\_e}$ value, which is obtained from engine controls, and the routine ends thereafter. Referring back to the comparison between the TM_fuel value and the threshold TM_Thd, if the TM_fuel value is higher than the threshold TM_Thd, then the difference between the TM_fuel_e value and the TM_fuel value is compared with a threshold E1_Thd. If it is higher than the threshold E1_Thd, an error flag E1 is set, otherwise, the error flag E1 is reset. The routine ends after the TM_fuel_e and TM_fuel values are reset to 0.

Hydrocarbons in a SCR system can also be detected by monitoring exhaust gas temperature. In a SCR system, the SCR catalyst (e.g. catalyst 130 in FIG. 1c) has certain capability in oxidizing hydrocarbons, and the oxidation capability is significantly increased when an AMOX (AMmonia OXidation) catalyst is used for removing ammonia slips. When hydrocarbons are oxidized in the catalyst, heat is released in the exothermic reactions, resulting in high exhaust gas temperature, which can be detected with a temperature sensor (e.g. the temperature sensor 146 in FIG. 1c) downstream from the SCR catalyst. However, due to large thermal mass of the SCR catalyst, when a high temperature is detected by the temperature sensor, it may be too late to prevent damages from happening. Compared to monitoring exhaust temperature, detecting unusual hydrocarbon level in exhaust gas is more effective, since extra hydrocarbons in exhaust gas is a direct indication of a dosing problem rather than a result of the problem. By detecting unusual hydrocarbon level in exhaust gas, a few actions, e.g. shutting off dosing and shutting down engine, can be taken early to prevent the problem from causing further damage to the system.

Referring back to the SCR system in FIG. 1c, in such a system, with the $m_f$ value in g/s and a NOx concentration sensing value $C_{NOx}$ in ppm, a NOx emission rate $m_{NOx}$ in g/s can be calculated with the following equation:

$$m_{NOx}=C_{NOx}*m_f*MW\_NOx*1e-6/MW\_EG \qquad (8)$$

where MW_NOx and MW_EG are, respectively, the molecular weight of NOx and exhaust gas. Equations (6) and (8) can be further used for calculating a total engine fueling amount and a total NOx emission amount, the values of which are indicative of issues in the engine and after-treatment systems. For example, in a period of engine running time, if the total engine fueling amount is lower than a possible lowest value, which is the value when engine is idle all the time, then an issue that may be caused by exhaust pipe leakage or exhaust flow bypassing can be detected. If the total engine fueling amount is higher than another threshold, which is indicative of a high power mode of the engine, then the total NOx emission amount is an indication of SCR system performance. It should be noted that normally the total NOx emission amount at low power modes of the engine cannot be used for detecting SCR control issues, since due to limits of deNOx reactions, reductant dosing is disabled when exhaust temperature is low, which is typically the case when the engine runs at low power modes.

Figure 4B:
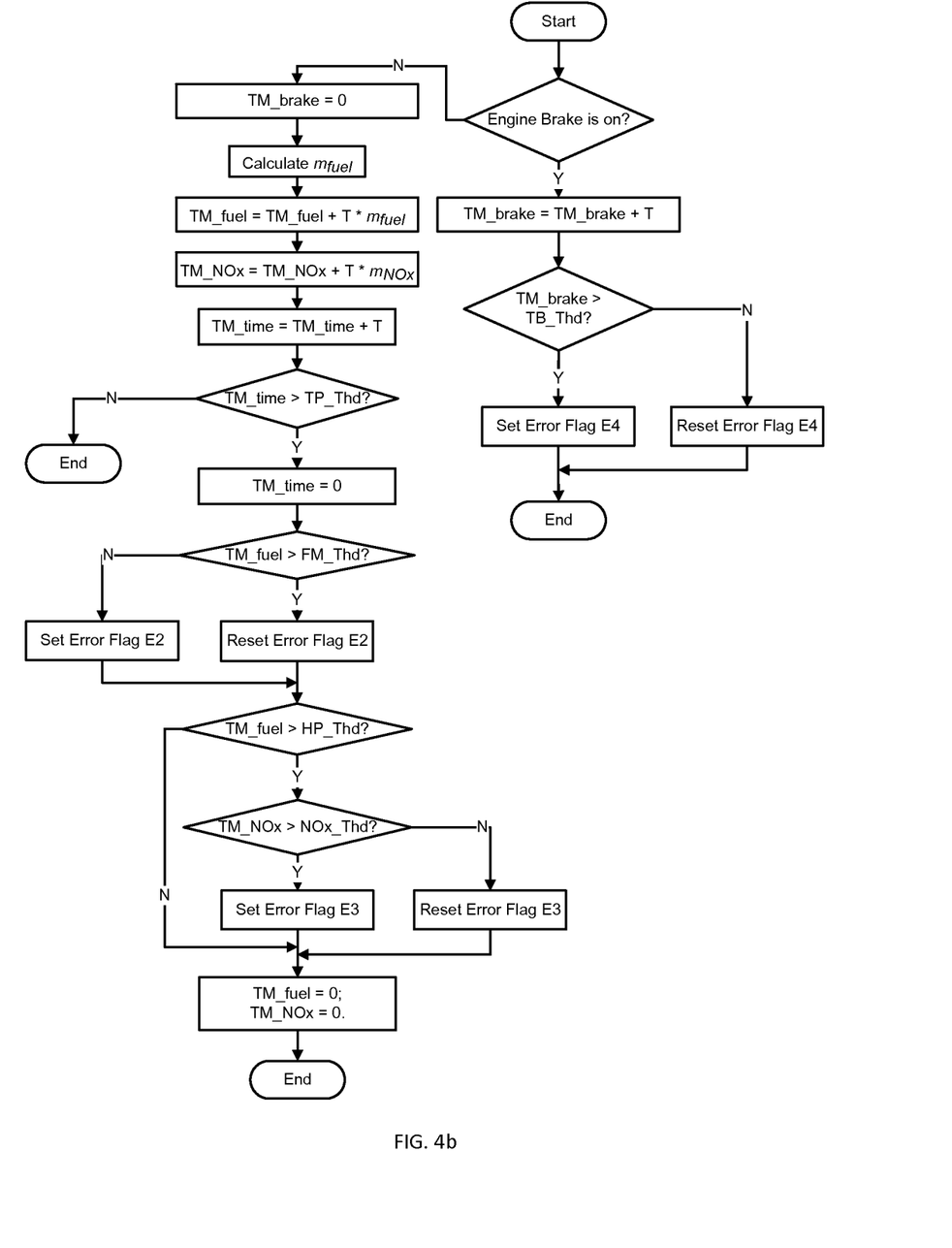
FIG. 4b is a flow chart of a diagnostic routine for detecting issues in an engine system with a SCR system using an estimated engine fueling rate and an engine out NOx level.

An algorithm for detecting anomalies in exhaust flow and SCR control system with the calculated total engine fueling amount and total NOx emission amount can also be realized with a routine incorporated in the block 300 in a service routine of FIG. 3. Referring to FIG. 4b, after the routine starts, an engine brake status is checked. If the engine brake is turned on, then a variable TM_brake, which is indicative of the running time of the engine brake, is incremented by the execution period time T. When the TM_brake value is higher than a threshold TB_Thd, then an error flag F4 is set, otherwise the error flag F4 is reset. The routine ends thereafter. If the engine brake is off, then the variable TM_brake is reset to zero, and the engine fueling rate $m_{fuel}$ is calculated according to equation (6). A total fueling amount value, TM_fuel, and a total NOx emission value TM_NOx are calculated together with a total time value TM_time thereafter, and the TM_time value is compared with a threshold TP_Thd. The routine ends if it not higher than the threshold TP_Thd, otherwise, the TM_time value is reset to zero and an error flag E2 is set if the TM_fuel value is not higher than a threshold FM_Thd. The error flag E2 is reset when the TM_fuel value is higher than the threshold hold. And when the TM_fuel value is higher than a threshold HP_Thd, an error flag E3 is set if the TM_NOx value is higher than a threshold NOx_Thd and reset otherwise. The routine ends after the TM_fuel value and the TM_NOx value are reset to 0.

Figure 4C:
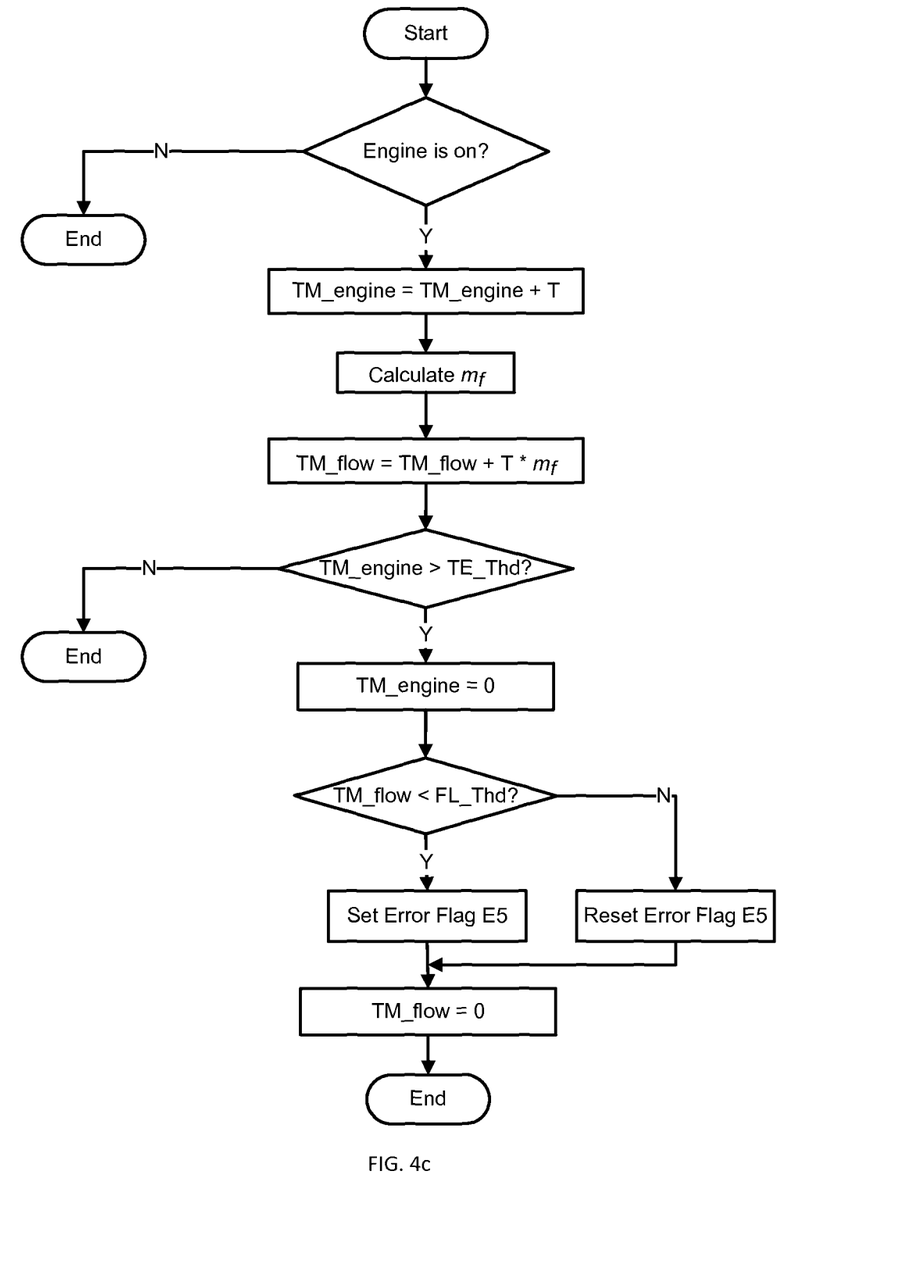
FIG. 4c is a flow chart of a diagnostic routine for detecting issues in a SCR system using a calculated exhaust flow rate.

In addition to calculating the engine fueling rate and NOx emission rate, the calculated exhaust mass flow value $m_f$ can also be used independently in detecting issues in an SCR system. To protect heating elements in lambda sensors and NOx sensors from being damaged by condensed moisture, normally the sensors are only turned on when exhaust temperature is higher than a threshold for a period of time. Consequently, if a SCR system is bypassed, then system OBDs (On Board Diagnostics) may fail since low temperature disables the NOx sensor in the system. A way to detect such a tampering issue is using the calculated $m_f$ value to find anomalies in the system. An exemplary algorithm of such a detection method can be realized in routine as shown in FIG. 4c, which is incorporated in the block 300 in the service routine of FIG. 3. Referring to FIG. 4c, an engine status is checked after the routine starts. If the engine is turned off, then the routine ends. Otherwise, an engine running time value TM_engine is incremented by the execution period time T, and the $m_f$ value is calculated. A total exhaust flow value TM_flow is calculated thereafter and the TM_engine value is compared with a threshold TE_Thd. The routine ends if it is lower than the threshold TE_Thd, otherwise, the TM_engine value is reset to zero and an error flag E5 is set if the TM_Flow value is lower than a threshold FL_Thd, which is determined by the minimum possible exhaust mass-flow rate in the engine running time of TM_engine, e.g., the mass-flow rate when the engine is at idle status. The error flag E5 is reset if the TM_flow value is not lower than the threshold FL_Thd, and the routine ends after the TM_flow value is reset to zero.

In engines without EGR, since exhaust gas flow rate is mainly affected by engine speed and engine fueling rate, the calculated $m_f$ value together with the lambda sensing value can also be used for estimating engine speed and diagnosing issues in engine speed sensors. In a simple exemplary method, the engine speed Es can be calculated with a lookup table with two inputs of the $m_f$ value and the $m_{fuel}$. Elements in the lookup table can be populated with testing results obtained with different exhaust flow rates and engine fueling rates. The calculated Es value then can be compared to measured engine speed value in detecting issues in an engine speed sensor when the $m_f$ value is steady, i.e., the changing rate of the $m_f$ value is low, and a service routine of FIG. 3 can be used for realizing the diagnostic algorithm.

Referring back to FIG. 2, in engines without EGR, normally both of engine out NOx level and exhaust flow rate are mainly affected by engine fueling rate and engine speed. As a result, an engine out NOx level can also be estimated using exhaust flow rate and lambda sensing values or engine fueling rate, which can be calculated with the lambda sensing values according to equation (6). A simple method for such estimation is calculating the engine out NOx level using a lookup table with two inputs of an engine fueling rate calculated according to equation (6), or the sensing values lambda, and an exhaust gas flow rate calculated according to equation (3). The elements in this lookup table can be obtained with experimental results obtained with different engine fueling rates and engine exhaust flow rates. Compared to that calculated with exhaust flow rate and exhaust temperature, the engine out NOx level estimated with engine fueling rate or lambda sensing values and exhaust flow rate is more accurate in transient, however, it is not available at low exhaust temperature which disables lambda sensing. These two methods can be combined in estimating engine out NOx level, i.e., when exhaust temperature is low, using the value calculated with exhaust temperature and exhaust flow rate, and trusting more the value calculated with engine fueling rate or lambda sensing values and exhaust flow rate when exhaust temperature is high.

Figure 4D:
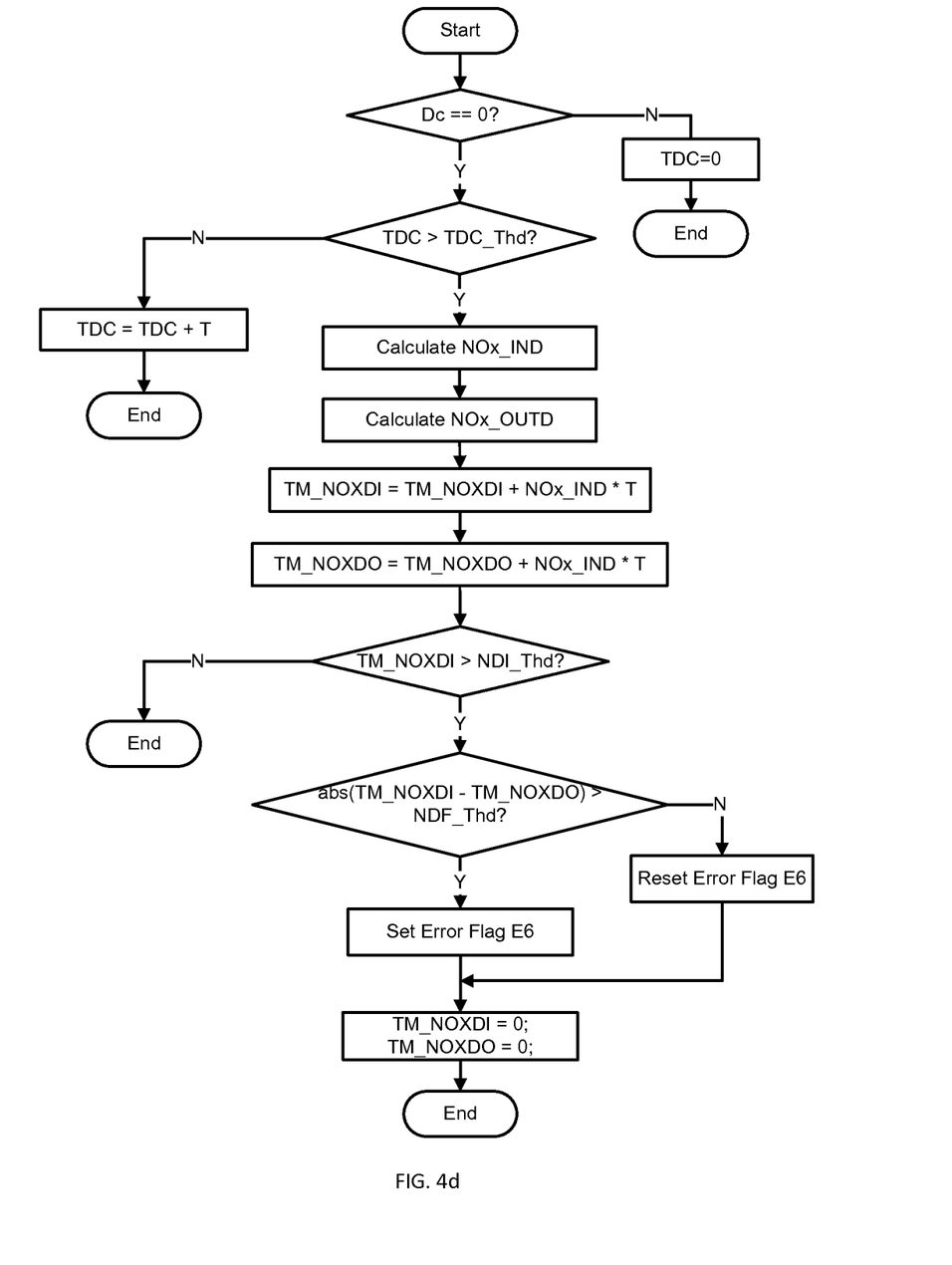
FIG. 4d is a flow chart of a diagnostic routine for detecting issues in a SCR control system using an estimated engine out NOx level and system out NOx sensing values.

The engine out NOx value calculated with engine fueling rate or lambda sensing values and exhaust flow rate can also be used for diagnosing failures in a SCR system and NOx sensor rationality issues. In a SCR control system of FIG. 1c, when dosing is disabled, e.g. when exhaust temperature is low, when ammonia storage in the SCR catalyst is exhausted, the engine out NOx level should equal to that sensed by the NOx sensor, since no NOx is reduced. Therefore, if there is a mismatch between the calculated engine out NOx level and the NOx sensor sensing value, either there is an issue in engine control causing inaccuracy in estimating engine out NOx or the NOx sensor has a problem. Both of NOx flow rate and NOx concentration can be used in detecting the issues and an exemplary algorithm with NOx flow rate calculation can be realized with a routine as shown in FIG. 4d, which can be incorporated in the block 300 of the service routine of FIG. 3. Referring to FIG. 4d, after the routine starts, the reductant dosing rate Dc is checked. If the dosing rate is not zero, then a timer TDC is reset to zero and the routine ends, otherwise, the TDC value is compared to a threshold TDC_Thd. The TDC value is incremented and the routine ends if it is not higher than the threshold TDC_Thd, otherwise, an engine out NOx flow-rate value NOx_IND and a system out NOx flow-rate value NOx_OUTD are calculated. The NOx_OUTD value is calculated according to equation (8), while the following formula can be used for calculating the NOx_IND value:

$$NOx\_IND = Lookup(m_f, m_{fuel}) \tag{F5}$$

wherein Lookup ( ) is a lookup calculation. After the NOx_IND value and the NOx_OUTD value are obtained, a total amount of engine out NOx value TM_NOXDI and a total amount of system out NOx value TM_NOXDO are accumulated and the TM_NOXDI value is compared with a threshold NDI_Thd. The routine ends if it is not higher than the threshold NDI_Thd, otherwise, the difference between the TM_NOXDI value the TM_NOXDO value is compared to a threshold NDF_Thd. An error flag E6 is set if the difference value is higher than the threshold NDF_Thd, and is reset otherwise. And the routine ends after the TM_NOXDI value and the TM_NOXDO value are reset to zero.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

The invention claimed is:

1. An exhaust gas processing system of an internal combustion engine, comprising:
   a selective catalytic reduction device for reducing NOx in an exhaust gas flow produced by said internal combustion engine;
   a decomposition pipe positioned upstream from said selective catalytic reduction device including a first high pressure passage, a low pressure passage, and a second high pressure passage, wherein said first high pressure passage has a cross-section area larger than that of said low pressure passage;
   a temperature sensor providing a temperature sensing signal indicative of a temperature in said first high pressure passage;
   a first pressure sensor generating a pressure sensing signal indicative of a pressure in said first high pressure passage;
   a second pressure sensor generating a differential pressure sensing signal indicative of a difference between said pressure in said first high pressure passage and a pressure in said low pressure passage;
   a reductant injection device positioned at a transition between said low pressure passage and said second high pressure passage for providing a reductant reducing NOx in said exhaust gas flow; and
   a controller configured to provide a control signal to said reductant injection device controlling a delivery rate of said reductant into said exhaust gas flow in response to said temperature sensing signal, said pressure sensing signal, and said differential pressure sensing signal.

2. The exhaust gas processing system of claim 1, wherein said controller is further configured to determine an exhaust flow rate value, which is indicative of a flow rate of said exhaust gas flow, in response to said temperature sensing signal, said pressure sensing signal, and said differential pressure sensing signal.

3. The exhaust gas processing system of claim 2, wherein said controller is further configured to determine a NOx flow rate value, which is indicative of a flow rate of NOx in said exhaust gas flow upstream from said selective catalytic reduction device, in response to said temperature sensing signal, and said exhaust flow rate value.

4. The exhaust gas processing system of claim 1, further comprising:
   a lambda sensing means generates a lambda sensing signal indicative of a relative air-to-fuel ratio of said internal combustion engine.

5. The exhaust gas processing system of claim 4, wherein said controller is further configured to determine a fueling rate value indicative of a fueling rate of said internal combustion engine in response to said lambda sensing signal.

6. The exhaust gas processing system of claim 5, wherein said controller is further configured to determine a NOx flow rate value, which is indicative of a flow rate of NOx in said exhaust gas flow upstream from said selective catalytic reduction device, in response to said lambda sensing signal, said temperature sensing signal, said pressure sensing signal, and said differential pressure sensing signal.

7. The exhaust gas processing system of claim 4, further comprising:
   a NOx sensor in communication to said controller generating a NOx sensing signal indicative of a NOx concentration in said exhaust gas flow downstream from said selective catalytic reduction device.

8. The exhaust gas processing system of claim 7, wherein said lambda sensing means is integrated within said NOx sensor.

9. An exhaust gas processing system of an internal combustion engine, comprising:
   an exhaust device with an outlet port fluidly coupled to a tailpipe of said internal combustion engine and an inlet port receiving an exhaust gas flow generated from said internal combustion engine, including a first high pressure passage, a low pressure passage, and a second high pressure passage, wherein said first high pressure inlet passage has a cross-section area larger than that of said low pressure passage;
   a temperature sensor providing a temperature sensing signal indicative of a temperature in said first high pressure passage;
   a first pressure sensor generating a pressure sensing signal indicative of a pressure in said first high pressure passage;
   a second pressure sensor generating a differential pressure sensing signal indicative of a difference between said pressure in said first high pressure passage and a pressure in said low pressure passage; and
   a controller configured to determine an upstream NOx level value indicative of a NOx level in said exhaust gas flow upstream from said exhaust device, in response to said temperature sensing signal, said pressure sensing signal, and said differential pressure sensing signal.

10. The exhaust gas processing system of claim 9, wherein said controller is further configured to determine an exhaust flow rate value, which is indicative of a flow rate of said exhaust gas flow, in response to said temperature sensing signal, said pressure sensing signal, and said differential pressure sensing signal.

11. The exhaust gas processing system of claim 9, further comprising:
a lambda sensing device positioned downstream from said exhaust device generating a lambda sensing signal indicative of a relative air-to-fuel ratio of said internal combustion engine.

12. The exhaust gas processing system of claim 11, wherein said controller is further configured to determine said NOx level value in response to said lambda sensing signal.

13. The exhaust gas processing system of claim 12, wherein said lambda sensing device further generates a downstream NOx sensing signal indicative of a NOx level in said exhaust gas flow downstream from said exhaust device.

14. The exhaust gas processing system of claim 13, wherein said controller is further configured to determine a fault value indicative of an anomaly in the said exhaust gas processing system if a difference between said upstream NOx level value and a value of said downstream NOx sensing signal is greater than a predetermined threshold.

15. An diagnostic control apparatus of an internal combustion engine system including an internal combustion engine and an exhaust gas processing system, comprising
an exhaust device with an outlet port fluidly coupled to a tail pipe of said internal combustion engine system and an inlet port receiving an exhaust gas flow generated from said internal combustion engine, including a first high pressure passage, a low pressure passage, and a second high pressure passage, wherein said first high pressure inlet passage has a cross-section area larger than that of said low pressure passage;
a temperature sensor providing a temperature sensing signal indicative of a temperature in said first high pressure passage;
a first pressure sensor generating a pressure sensing signal indicative of a pressure in said first high pressure passage;
a second pressure sensor generating a differential pressure sensing signal indicative of a difference between said pressure in said first high pressure passage and a pressure in said low pressure passage;
a lambda sensing means generating a lambda sensing signal indicative of a relative air-to-fuel ratio of said internal combustion engine;
an exhaust flow controller determining an exhaust flow rate value, which is indicative of a flow rate of said exhaust gas flow, in response to said temperature sensing signal, said pressure sensing signal, and said differential pressure sensing signal; and
a diagnostic controller determining and indicating an anomaly in said internal combustion engine system in response to said exhaust flow rate value and said lambda sensing signal.

16. The diagnostic control apparatus of claim 15, further comprising:
a NOx sensor generating a NOx sensing signal indicative of a NOx level in said exhaust gas flow downstream from said exhaust device.

17. The diagnostic control apparatus of claim 16, wherein said diagnostic controller is further configured to determine said anomaly in response to said lambda sensing signal and said NOx sensing signal.

18. The diagnostic control apparatus of claim 17, wherein said diagnostic controller is further configured to determine an upstream NOx level value indicative of a NOx level in said exhaust gas flow upstream from said exhaust device in response to said lambda sensing signal and said exhaust flow rate value, and determine said anomaly in response to said upstream NOx level value and said NOx sensing signal.

19. The diagnostic control apparatus of claim 15, wherein said diagnostic controller is further configured to determine a total fueling rate value indicative of a total fueling rate of said internal combustion engine system in response to said lambda sensing signal and said exhaust flow rate value, and determine said anomaly in response to said total fueling rate value.

20. The diagnostic control apparatus of claim 19, wherein said diagnostic controller is further configured to receive an engine fueling rate value from an engine control module indicative of an engine fueling rate, and determine said anomaly in response to said total fueling rate value and said engine fueling rate value.

\* \* \* \* \*